US012503748B2

(12) United States Patent
Maertens et al.

(10) Patent No.: US 12,503,748 B2
(45) Date of Patent: Dec. 23, 2025

(54) PURIFICATION OF ACTINIUM

(71) Applicant: SCK.CEN, Brussels (BE)

(72) Inventors: Dominic Maertens, Westerlo (BE);
Karen Van Hecke, Lokeren (BE);
Thomas Cardinaels, Mol (BE)

(73) Assignee: SCK.CEN, Brussels (BE)

( * ) Notice: Subject to any disclaimer, the term of this patent is extended or adjusted under 35 U.S.C. 154(b) by 1134 days.

(21) Appl. No.: 17/422,968

(22) PCT Filed: Jan. 15, 2020

(86) PCT No.: PCT/EP2020/050879
§ 371 (c)(1),
(2) Date: Jul. 14, 2021

(87) PCT Pub. No.: WO2020/148316
PCT Pub. Date: Jul. 23, 2020

(65) Prior Publication Data
US 2022/0145423 A1    May 12, 2022

(30) Foreign Application Priority Data
Jan. 16, 2019  (EP) ..................... 19152170

(51) Int. Cl.
*C22B 60/02*    (2006.01)
*B01D 15/18*    (2006.01)
(Continued)

(52) U.S. Cl.
CPC ...... *C22B 60/0295* (2013.01); *B01D 15/1871* (2013.01); *B01D 15/426* (2013.01);
(Continued)

(58) Field of Classification Search
None
See application file for complete search history.

(56) References Cited

U.S. PATENT DOCUMENTS 9,284,620 B2    3/2016    Heres et al.
9,534,277 B1    1/2017    Moreno Bermudez et al.
(Continued)

FOREIGN PATENT DOCUMENTS

CN    101390171 A    3/2009
CN    102549176 A    7/2012
(Continued)

OTHER PUBLICATIONS

Ostapenko, V. "Extraction chromatographic behavior of actinium and REE on DGA, Ln an TRU resins in nitric acid solutions." J. Radioanal. Nucl. Chem. (2015) 306:707-711. (Year: 2015).*
(Continued)

*Primary Examiner* — Anthony J Zimmer
*Assistant Examiner* — Zachary John Baum
(74) *Attorney, Agent, or Firm* — Workman Nydegger

(57) ABSTRACT

A method for purifying Ac from a mixture includes Ac and at least one element selected from Ra, Pb, Po, Bi and La. The method includes the steps of: (a) performing a first separation using a first extraction chromatographic column based on a first resin (either a diglycolamide resin or a dialkylphosphoric acid resin) and a first matrix solution; and (b) performing a second separation using a second extraction chromatographic column based on a second resin (respectively either a dialkylphosphoric acid resin or a diglycolamide resin).

12 Claims, 5 Drawing Sheets

(51) Int. Cl.
  *B01D 15/42* (2006.01)
  *C22B 7/00* (2006.01)
  *G21G 1/00* (2006.01)

(52) U.S. Cl.
  CPC ............ *C22B 7/006* (2013.01); *G21G 1/001* (2013.01); *G21G 2001/0089* (2013.01)

(56) References Cited

U.S. PATENT DOCUMENTS

| | | | |
|---|---|---|---|
| 9,790,573 | B2 | 10/2017 | Moreno Bermudez et al. |
| 9,874,550 | B2 | 1/2018 | Hjellum |
| 10,351,930 | B2 | 7/2019 | Valkama et al. |
| 10,697,043 | B2 | 6/2020 | Senba et al. |
| 10,702,613 | B2 | 7/2020 | Mantzilas et al. |
| 2006/0004491 | A1 | 1/2006 | Welch et al. |
| 2006/0153760 | A1 | 7/2006 | Meikrantz et al. |
| 2009/0191122 | A1 | 7/2009 | Moreno Bermudez et al. |
| 2012/0160061 | A1 | 6/2012 | Heres et al. |
| 2013/0266475 | A1 | 10/2013 | Moreno Bermudez et al. |
| 2016/0209387 | A1 | 7/2016 | Hjellum |
| 2017/0009320 | A1 | 1/2017 | Moreno Bermudez et al. |
| 2017/0137916 | A1 | 5/2017 | Moreno Bermudez et al. |
| 2017/0175224 | A1 | 6/2017 | Valkama et al. |
| 2018/0180585 | A1* | 6/2018 | Hjellum .................. C01F 13/00 |
| 2019/0009265 | A1 | 1/2019 | Mantzilas et al. |
| 2019/0015530 | A1 | 1/2019 | Mantzilas et al. |
| 2019/0062869 | A1 | 2/2019 | Senba et al. |
| 2020/0406247 | A1 | 12/2020 | Mantzilas et al. |

FOREIGN PATENT DOCUMENTS

| | | |
|---|---|---|
| CN | 105734287 A | 7/2016 |
| CN | 105899269 A | 8/2016 |
| CN | 106460091 A | 2/2017 |
| CN | 108472555 A | 8/2018 |
| CN | 108472556 A | 8/2018 |
| CN | 108699628 A | 10/2018 |
| EP | 1987522 B1 | 7/2010 |
| JP | S47-023374 A | 10/1972 |
| JP | 2007512118 A | 5/2007 |
| JP | 2009527731 A | 7/2009 |
| JP | 2016536593 A | 11/2016 |
| KR | 1020160043039 A | 4/2016 |
| NO | 2007096119 A2 | 8/2007 |
| WO | 03018852 A1 | 3/2003 |
| WO | 2007096119 A2 | 8/2007 |
| WO | 2015022074 A1 | 2/2015 |

OTHER PUBLICATIONS

Testa, C., et al. Radium, uranium and thorium concentrations in low specific activity scales and in waters of some oil and gas production plants. J. Radioanal. Nucl. Chem., 1993, vol. 170, No. 1, pp. 117-124. (Year: 1993).*

Search Report from corresponding Chinese Application No. 20208009263.2, Jan. 15, 2020.

Office Action from corresponding Chinese Application No. 202080009263.2, Jun. 14, 2022.

Japanese Office Action from Corresponding Japanese Patent Application No. JP2021-539976, Nov. 7, 2023.

International Search Report and Written Opinion from PCT Application No. PCT/EP2020/050879, Mar. 23, 2020.

Extended Search Report from corresponding EP Application No. EP19152170.7, Jun. 26, 2019.

Ostapenko et al., "Extraction Chromatographic Behavior of Actinium and REE on DGA, Ln and TRU Resins in Nitric Acid Solutions," Journal of Radioanalytical and Nuclear Chemistry, vol. 306, No. 3, Aug. 1, 2015, pp. 707-711.

Korean Office Action from Corresponding Korean Patent Application No. KR 10-2021-7021695, Aug. 12, 2024.

Search Report from Indian Application No. 202127030933, Mar. 16, 2023.

* cited by examiner

PURIFICATION OF ACTINIUM

TECHNICAL FIELD OF THE INVENTION

The present invention relates to purifying Ac and more in particular to purifying Ac from a mixture comprising Ac and at least one element selected from Ra, Pb, Po, Bi and La.

BACKGROUND OF THE INVENTION

It is known that Ac-225 can be used in clinical applications in nuclear medicine, e.g. for the radiation treatment of malignant tumours. One way to produce Ac-225 is by irradiating Ra-226 targets (e.g. $RaCl_2$) with protons. After irradiation, the Ac-225 must typically be purified from the Ra and its progeny (e.g. Pb, Po and Bi) before it is to be used.

One approach to achieve such a purification is described in EP1987522B1. This approach comprises first separating Ac-225 from Ra-226 and other Ra-isotopes by an extraction chromatography based on a first extractant system coated on a solid support. Herein the first extractant system was a carbamoyl phosphine oxide derivative in a trialkyl phosphate (e.g. octyl(phenyl)-N,N-diisobutylcarbamoylphosphine oxide (CMPO) in tributylphosphate (TBP), such as a TRU resin or RE resin), a carbamoyl carbamate derivative selected from N,N,N',N'-tetraoctyl carbamoyl carbamate or N,N,N',N'-tetra(2-ethylhexyl) carbamoyl carbamate, or di-(2-ethylhexyl)phosphoric acid (HDEHP). Subsequently, Ac-225 is further separated from Po-210 and Pb-210 by means of another extraction chromatography based on a second extractant system coated on a solid support. The second extractant system is a 4(5'),4'(5')-di(alkylcyclohexano)-18-crown-6 in an alcohol (e.g. 4,4'(5')-di(t-butylcyclohexano)-18-crown-6 in 1-octanol, such as an Sr resin).

Nevertheless, there is still room in the art for better methods for purifying Ac. Particularly since Ac-225 has a limited decay time of 10 days, making the speed and performance of its purification process of critical importance.

SUMMARY OF THE INVENTION

It is an object of the present invention to provide good methods for purifying Ac from a mixture comprising Ac and at least one element selected from Ra, Pb, Po, Bi and La. It is a further object of the present invention to provide good products associated therewith. This objective is accomplished by methods, devices, computer program products and computer-readable media according to the present invention.

It is an advantage of embodiments of the present invention that Ac can be well purified by separating it from a number of thereto related elements. It is a further advantage of embodiments of the present invention that the related elements can span a range of chemical affinities.

It is an advantage of embodiments of the present invention that an irradiated target can be used as a source from which to purify the Ac. It is a further advantage of embodiments of the present invention that the Ac can be purified from an irradiated Ra target (e.g. a proton irradiated Ra-226 target). It is yet a further advantage of embodiments of the present invention that Ra (e.g. Ra-226) can be retrieved from the mixture and can for example be recycled to form a new irradiated target.

It is an advantage of embodiments of the present invention that Ac can be purified in a quick and relatively straightforward fashion. It is a further advantage of embodiments of the present invention that this makes it well suited to purify Ac-225, which has limited half-life time of only 10 days.

It is an advantage of embodiments of the present invention that Ac can undergo subsequent purification steps without needing to collect the intermediate fractions.

It is an advantage of embodiments of the present invention that the solvent system of an elution step can be compatible with that of a subsequent loading step.

It is an advantage of embodiments that the matrix solutions, washing solutions and eluents can be based on readily available chemicals.

It is an advantage of embodiments of the present invention that at least a portion of the Ra in the mixture can be precipitated therefrom prior to undergoing the further separation steps.

It is an advantage of embodiments of the present invention that the purification can be yet further improved by using also a crown ether resin and/or a dialkyl alkylphosphonate resin. It is a further advantage of embodiments of the present invention that the crown ether resin based and/or the dialkyl alkylphosphonate resin based extraction chromatographic column can also be coupled in tandem with the other extraction chromatographic columns.

It is an advantage of embodiments of the present invention that the method can be substantially fully automated by a device, making it easy, quick and straightforward to perform.

In a first aspect, the present invention relates to a method for purifying Ac from a mixture comprising Ac and at least one element selected from Ra, Pb, Po, Bi and La, the method comprising: (a) performing a first separation, comprising (a1) loading the mixture on a first extraction chromatographic column based on a first resin and a first matrix solution, (a2) washing the mixture loaded on the first extraction chromatographic column with a first washing solution, and (a3) eluting the mixture loaded on the first extraction chromatographic column with a first eluent to obtain a first eluate; and (b) performing a second separation, comprising (b1) loading the first eluate on a second extraction chromatographic column based on a second resin and a second matrix solution, (b2) washing the first eluate loaded on the second extraction chromatographic column with a second washing solution, and (b3) eluting the first eluate loaded on the second extraction chromatographic column with a second eluent to obtain a second eluate containing the purified Ac. Herein, either the first resin is a diglycolamide (DGA) resin, in which case the first matrix solution has a pH between −0.8 and 0, the first washing solution has a pH between −0.8 and 0 and the first eluent has a pH between 1 and 4, and the second resin is a dialkylphosphoric acid (HDAP) resin, the second matrix solution has a pH between 1 and 4, the second washing solution has a pH between 1 and 4 and the second eluent has a pH between −0.8 and 0. Or the first resin is a dialkylphosphoric acid resin, in which case the first matrix solution has a pH between 1 and 4, the first washing solution has a pH between 1 and 4 and the first eluent has a pH between −0.8 and 0, and the second resin is a diglycolamide resin, the second matrix solution has a pH between −0.8 and 0, the second washing solution has a pH between −0.8 and 0 and the second eluent has a pH between 1 and 4. If the second column is the last column used, the pH can also be between −0.9 and −1.1. The method is characterised in that the first eluate obtained in step a3 is loaded immediately onto the second extraction chromatographic column in step b1, by forming a tandem between the first and the second extraction chromatographic column.

It is an advantage of embodiments of the present invention that the methods and systems allow for obtaining high purity Ac in relatively short time frames.

It is an advantage of embodiments of the present invention that methods and systems are provided that allow automisation of the process.

In a second aspect, the present invention relates to a system for carrying out a the method according to any embodiment of the first aspect. The method may comprise means for carrying out the steps of a method according to any embodiment of the first embodiment. The system may comprise an input means for receiving the mixture, an output means for outputting the Ac and a controller or controlling device for automatically performing steps a and b of the method and optionally step c if present in the method. The controller thus typically is programmed for controlling that the first eluate obtained in step a3 is loaded immediately onto the second extraction chromatographic column in step b1, by forming a tandem between the first and the second extraction chromatographic column. The system thus comprises a tandem between the first and the second extraction chromatographic column.

In some embodiments, the system comprises a first extraction chromatographic column based on a first resin and a first matrix solution and a second extraction chromatographic column based on a second resin and a second matrix solution wherein either the first resin is a diglycolamide resin and the first matrix solution has a pH between −0.8 and 0, and the second resin is a dialkyl phosphoric acid resin and the second matrix solution has a pH between 1 and 4, or the first resin is a dialkyl phosphoric acid resin, the first matrix solution has a pH between 1 and 4, and the second resin is a diglycolamide resin and the second matrix solution has a pH between −0.8 and 0, and wherein the first extraction column and the second extraction column are configured for allowing an eluate obtained from the first extraction column to be directly loaded to the second extraction column by forming a tandem between the first and the second extraction chromatographic column.

The system may be provided with a first washing solution for washing the first mixture loaded on the first extraction chromatographic column and with a second washing solution for washing the second mixture loaded on the second extraction column, wherein the first washing solution has a pH between −0.8 and 0 and the second washing solution has a pH between 1 and 4, or vice versa.

In a third aspect, the present invention may relate to a computer program product comprising instructions which, when the program is executed by a computer, cause the computer to carry out the steps of the method according to any embodiment of the first aspect and thus the computer program product is such that it comprises instructions for loading the first eluate obtained in step a3 immediately onto the second extraction chromatographic column in step b1, by forming a tandem between the first and the second extraction chromatographic column.

In a fourth aspect, the present invention relates to a computer-readable medium comprising instructions which, when executed by a computer, cause the computer to carry out the steps of the method according to any embodiment of the first aspect.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
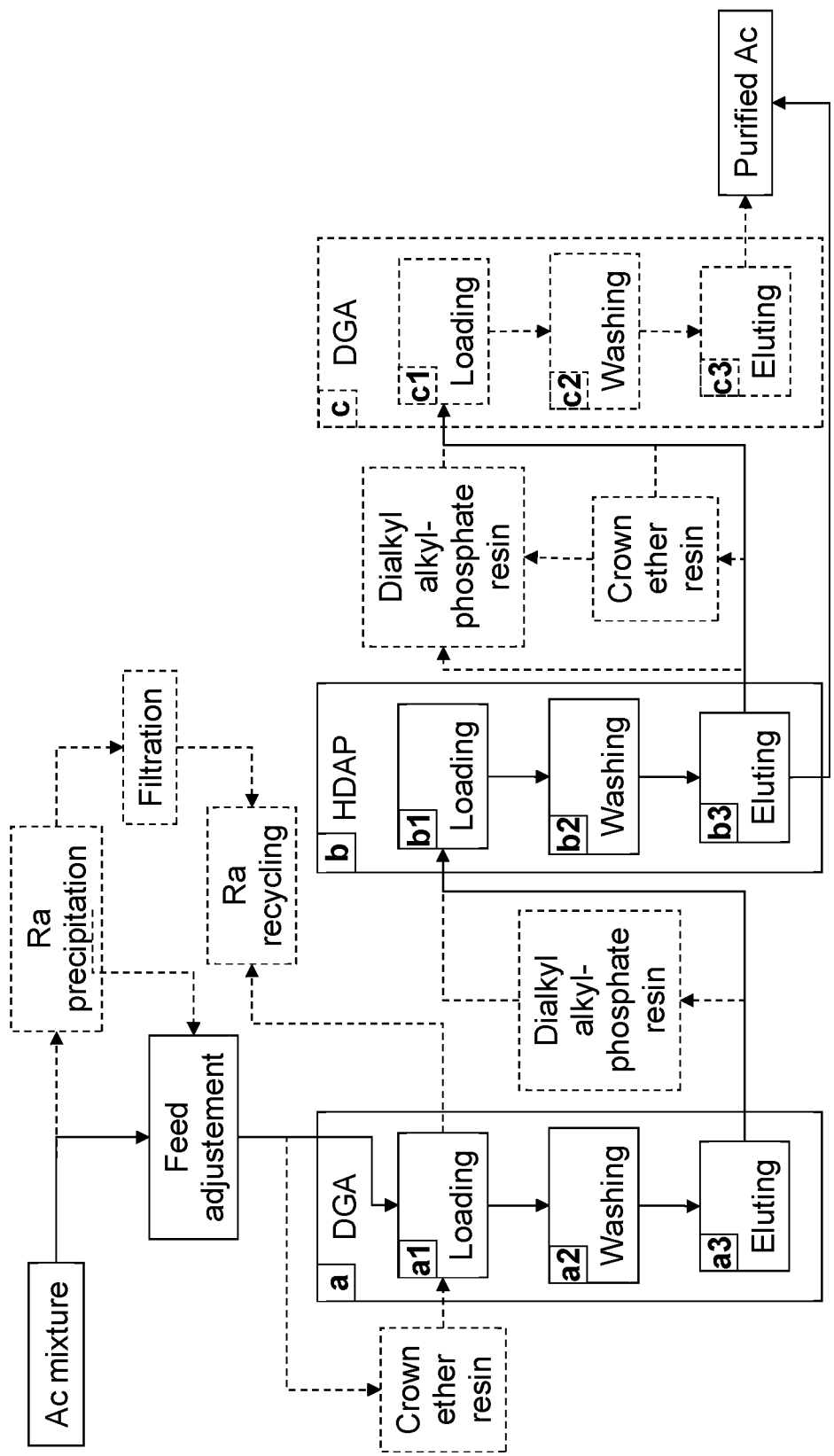
FIGS. 1 and 2 are flow-charts in accordance with embodiments of the present invention.
Figure 2:
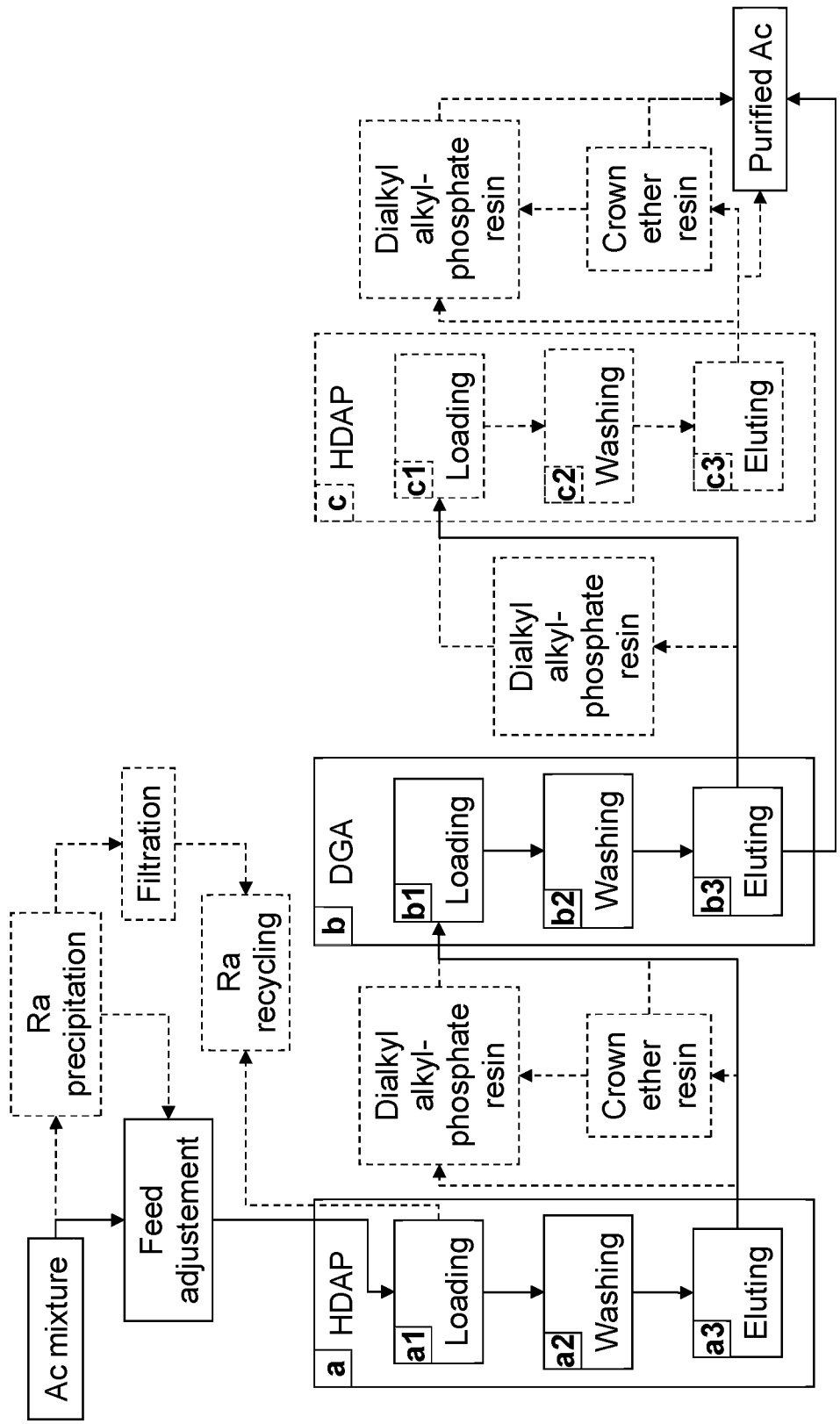

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms over, under and the like in the description and the claims are used for descriptive purposes and not necessarily for describing relative positions. It is to be understood that the terms so used are interchangeable with their antonyms under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practised without these specific details. In other instances, well-known methods, structures and techniques have not been shown in detail in order not to obscure an understanding of this description.

The following terms are provided solely to aid in the understanding of the invention.

As used herein, and unless otherwise specified, an 'alkyl' substituent is a straight, branched or cyclic (cycloalkyl) saturated hydrocarbon monovalent substituent. An alkyl substituent may for example have from 1 to 100 carbon atoms, preferably from 2 to 50, yet more preferably from 3 to 20, such as from 5 to 10. In embodiments, different alkyl substituents within a single compound may be selected independently from one another. The above notwithstanding, different alkyl substituents within a single compound may in particular (e.g. preferred) embodiments be selected to be equal.

In a first aspect, the present invention relates to a method for purifying Ac from a mixture comprising Ac and at least one element selected from Ra, Pb, Po, Bi and La, the method comprising: (a) performing a first separation, comprising (a1) loading the mixture on a first extraction chromatographic column based on a first resin and a first matrix solution, (a2) washing the mixture loaded on the first extraction chromatographic column with a first washing solution, and (a3) eluting the mixture loaded on the first extraction chromatographic column with a first eluent to obtain a first eluate; and (b) performing a second separation, comprising (b1) loading the first eluate on a second extraction chromatographic column based on a second resin and a second matrix solution, (b2) washing the first eluate loaded on the second extraction chromatographic column with a second washing solution, and (b3) eluting the first eluate loaded on the second extraction chromatographic column with a second eluent to obtain a second eluate containing the purified Ac. Herein, either the first resin is a diglycolamide (DGA) resin, in which case the first matrix solution has a pH between −0.8 and 0, the first washing solution has a pH between −0.8 and 0 and the first eluent has a pH between 1 and 4, and the second resin is a dialkylphosphoric acid (HDAP) resin, the second matrix solution has a pH between 1 and 4, the second washing solution has a pH between 1 and 4 and the second eluent has a pH between −0.8 and 0. Or the first resin is a dialkylphosphoric acid resin, in which case the first matrix solution has a pH between 1 and 4, the first washing solution has a pH between 1 and 4 and the first eluent has a pH between −0.8 and 0, and the second resin is a diglycolamide resin, the second matrix solution has a pH between −0.8 and 0, the second washing solution has a pH between −0.8 and 0 and the second eluent has a pH between 1 and 4. If the second column is the last column used, the pH can also be between −0.9 and −1.1.

In embodiments, the mixture may be a mixture derived from an irradiated target. In embodiments, the mixture may be a solution obtained by dissolving the irradiated target. In embodiments, dissolving the irradiated target may comprise dissolving the irradiated target in an acid solution, e.g. having a pH between −0.8 and 0 or between 1 and 4. In embodiments, the irradiated target may be an irradiated Ra target, preferably a proton irradiated Ra-226 target. In embodiments, the Ac may be Ac-225. The mixture can advantageously be a mixture comprising Ac-225, obtained by dissolving a proton irradiated Ra-226 target.

In embodiments, the diglycolamide resin may be a resin based on a diglycolamide. In embodiments, the diglycolamide may have a general chemical formula of:

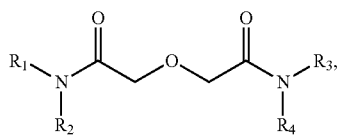

wherein $R_1$, $R_2$, $R_3$ and $R_4$ are independently selected alkyl substituents. In preferred embodiments, the diglycolamide may be selected from N,N,N',N'-tetraoctyldiglycolamide (TODGA; i.e. $R_1=R_2=R_3=R_4$=n-octyl) or N,N,N',N'-tetra(2-ethylhexyl)diglycolamide (TEHDGA; i.e. $R_1=R_2=R_3=R_4$=2-ethylhexyl).

In embodiments, the dialkylphosphoric acid resin may be a resin based on a dialkylphosphoric acid. In embodiments, the dialkylphosphoric acid may have a general chemical formula of

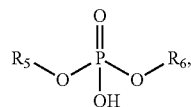

wherein $R_5$ and $R_6$ are independently selected alkyl substituents. In preferred embodiments, the dialkylphosphoric acid may be di-(2-ethylhexyl)phosphoric acid (HDEHP).

In embodiments, the method may comprise a step c for further purifying Ac, after step b, of (c) performing a third separation, comprising (c1) loading the second eluate on a third extraction chromatographic column based on a third resin and a third matrix solution, (c2) washing the second eluate loaded on the third extraction chromatographic column with a third washing solution, and (c3) eluting the second eluate loaded on the third extraction chromatographic column with a third eluent to obtain a third eluate containing the further purified Ac. Herein, if the first resin is a diglycolamide resin, then the third resin is a diglycolamide resin, the third matrix solution has a pH between −0.8 and 0, the third washing solution has a pH between −0.8 and 0 and the third eluent has a pH between 1 and 2 or between −0.9 and −1.1; or, if the first resin is a dialkylphosphoric acid resin, then the third resin is a dialkylphosphoric acid resin, the third matrix solution has a pH between 1 and 4, the third washing solution has a pH between 1 and 4 and the third eluent has a pH between −0.3 and 1.

It was realized within the present invention that a good (e.g. fast and reliable) separation strategy for Ac benefits from coupling several types of extraction chromatographic columns. In this respect, it was surprisingly found that an Ac separation strategy based on the combination (in either order) of a DGA and an HDAP extraction chromatographic column yields particularly good results; especially when the pH of the matrix solutions, washing solutions and eluents is selected as provided herein. Furthermore, the separation can be improved even further by alternating more of these DGA and a HDAP extraction chromatographic columns (e.g. in the form of a DGA/HDAP/DGA or an HDAP/DGA/HDAP system; or even a DGA/HDAP/DGA/HDAP or an HDAP/DGA/HDAP/DGA system; etc.)

In embodiments, the first eluate obtained in step a3 may be loaded immediately onto the second extraction chromatographic column in step b1, by forming a tandem between the first and the second extraction chromatographic column. In embodiments comprising step c, the second eluate obtained in step b3 may be loaded immediately onto the third extraction chromatographic column in step c, by forming a tandem between the second and the third extraction chromatographic column. In embodiments, the first eluent may be compatible with the loading in step b1. In embodiments comprising step c, the second eluent may be compatible with the loading in step c. By not separately collecting the first and/or second eluate, but instead loading them directly onto the next extraction, e.g. the speed of execution of the method can advantageously be improved. Furthermore, the solvent system used in an elution step advantageously needn't be changed before performing the next loading step.

In embodiments, the mixture may comprise (i) at least one element selected from Ra and Pb, and (ii) at least one element selected from Po and Bi. Po and Bi can advantageously remain adsorbed on a DGA extraction chromatographic column, when eluting the Ac-containing eluate. Ra and Pb can advantageously easily be washed off from either a DGA or an HDAP extraction chromatographic column.

In embodiments, one or more matrix solutions (i.e. the first and/or second and/or, if present, third matrix solution) may be aqueous solutions. In embodiments, the one or more matrix solutions may comprise a monovalent strong acid (e.g. $HNO_3$ or HCl) or a mixture of monovalent strong acids (e.g. $HNO_3$ and HCl). In preferred embodiments, all matrix solutions (i.e. the first and second and, if present, third matrix solution) may comprise the monovalent strong acid or the mixture of monovalent strong acids. In embodiments wherein the first resin is the DGA resin, the first matrix solution may have a monovalent strong acid concentration of between 1 and 6 M (e.g. between 1 and 4 M, such as between 1 and 3 M); and/or the second matrix solution may have a monovalent strong acid concentration of between 0.0001 and 0.1 M (e.g. 0.01 M); and/or, if present, the third matrix solution may have a monovalent strong acid concentration of between 1 and 6 M (e.g. between 1 and 4 M, such as 2 M). In embodiments wherein the first resin is the HDAP resin, the first matrix solution may have a monovalent strong acid concentration of between 0.0001 and 0.1 M (e.g. between 0.001 and 0.1 M, such as 0.01 M); and/or the second matrix solution may have a monovalent strong acid concentration of between 1 and 6 M (e.g. between 2 and 6 M, such as 2 M); and/or, if present, the third matrix solution may have a monovalent strong acid concentration of between 0.0001 and 0.1 M (e.g. 0.01 M). In embodiments, one or more matrix solutions may comprise Fe(III). In embodiments, the Fe(III) concentration may be between 50 and 2000 mg/L. In embodiments, the one or more matrix solutions comprising Fe(III) may comprise HCl as the monovalent strong acid. For example, the first resin may be the DGA resin and the first matrix solution may be a solution of HCl (e.g. 4 M HCl) and Fe(III) (e.g. 50 and 2000 mg/L).

In embodiments, one or more washing solutions (i.e. the first and/or second and/or, if present, third washing solution) may be aqueous solutions. In embodiments, the one or more washing solutions may comprise a monovalent strong acid (e.g. $HNO_3$ or HCl) or a mixture of monovalent strong acids (e.g. $HNO_3$ and HCl). In preferred embodiments, all washing solutions (i.e. the first and second and, if present, third washing solution) may comprise the monovalent strong acid or the mixture of monovalent strong acids. In embodiments wherein the first resin is the DGA resin, the first washing solution may have a monovalent strong acid concentration of between 1 and 6 M (e.g. between 3 and 6 M, such as 4 M, or between 1 and 3 M, such as 1 M); and/or the second washing solution may have a monovalent strong acid concentration of between 0.0001 and 0.1 M (e.g. between 0.001 and 0.1 M, such as 0.01 M); and/or, if present, the third washing solution may have a monovalent strong acid concentration of between 1 and 6 M (e.g. 4 M). In embodiments wherein the first resin is the HDAP resin, the first washing solution may have a monovalent strong acid concentration of between 0.0001 and 0.1 M (e.g. between 0.001 and 0.1 M, such as 0.01 M); and/or the second washing solution may have a monovalent strong acid concentration of between 1 and 6 M (e.g. between 2 and 6 M, such as 4 M); and/or, if present, the third washing solution may have a monovalent strong acid concentration of between 0.0001 and 0.1 M (e.g. between 0.001 and 0.1 M, such as 0.01 M). In embodiments, one or more washing solutions may comprise Fe(III). In embodiments, the Fe(III) concentration may be between 50 and 2000 mg/L. In embodiments, the one or more washing solutions comprising Fe(III) may comprise HCl as the monovalent strong acid. For example, the first resin may be the DGA resin and the first washing solution may be a solution of HCl (e.g. 4 M HCl) and Fe(III) (e.g. 50 and 2000 mg/L). In embodiments, a washing solution may initially have an initial acidity and/or composition and/or concentration, and the acidity and/or composition and/or concentration may change during the washing step (i.e. step a2 or b2 or c2).

In embodiments, one or more eluents (i.e. the first and/or second and/or, if present, third eluent) may be aqueous solutions. In embodiments, the one or more eluents may comprise a monovalent strong acid (e.g. $HNO_3$ or HCl) or a mixture of monovalent strong acids (e.g. $HNO_3$ and HCl). In preferred embodiments, all eluents (i.e. the first and second and, if present, third eluent) may comprise the monovalent strong acid or the mixture of monovalent strong acids. In embodiments wherein the first resin is the DGA resin, the first eluent may have a monovalent strong acid concentration of between 0.0001 and 0.1 M (e.g. 0.01 M); and/or the second eluent may have a monovalent strong acid concentration of between 1 and 6 M (e.g. between 1 and 4 M, such as 2 M); and/or, if present, the third eluent may have a monovalent strong acid concentration of between 0.01 and 0.1 M (e.g. 0.01 M) or between 8 and 12 M (e.g. 10 M). In embodiments wherein the first resin is the HDAP resin, the first eluent may have a monovalent strong acid concentration of between 1 and 6 M (e.g. between 2 and 6 M, such as 2 M); and/or the second eluent may have a monovalent strong acid concentration of between 0.0001 and 0.1 M (e.g. 0.01 M) or between 8 and 12 M (e.g. 10 M); and/or, if present, the third eluent may have a monovalent strong acid concentration of between 0.1 and 2 M (e.g. 2 M). In embodiments, an eluent may initially have an initial acidity and/or composition and/or concentration, and the acidity and/or composition and/or concentration may change during the washing step (i.e. step a3 or b3 or c3).

In embodiments, the method may comprise a further step of precipitating a Ra salt from the mixture. In embodiments, the further step of precipitating the Ra salt may be performed before step a. In embodiments, precipitating a Ra salt may comprise precipitating $Ra(NO_3)_2$ (e.g. in a concentrated $HNO_3$ solution, such as a 6 M or higher $HNO_3$ solution) or $RaCl_2$ (e.g. in a concentrated HCl solution, such as a 6 M or higher HCl solution).

In embodiments, the method may further comprise collecting and purifying Ra from the mixture. In embodiments, the purified Ra (e.g. in the form of a solution of $RaCl_2$) can be evaporated to dryness to produce a $RaCl_2$ solid. In embodiments, collecting and purifying Ra may comprise collecting and purifying the fraction obtained after the first washing step a2 and/or collecting and purifying the precipitated Ra salt. In embodiments, collecting and purifying the fraction obtained after the first washing step a2 may comprise separating the Ra from Po and/or Fe(III). In embodiments, separating the Ra from Po and/or Fe(III) may comprise the use of a DGA extraction chromatographic column. In embodiments, separating the Ra from Po may comprise washing the DGA extraction chromatographic column with a 0.001-0.1 M HCl or 1-5 M HCl solution. In this way, Ra can advantageously be quantitatively removed from the DGA extraction chromatographic column while leaving Po on it. In embodiments, separating the Ra from Po and/or Fe(III) may comprise the use of a DGA extraction chromatographic column. In embodiments, separating the Ra from Fe(III) may comprise washing the DGA extraction chromatographic column with a 1-5 M HCl solution. In this way, Ra can advantageously be quantitatively removed from the DGA extraction chromatographic column while leaving Fe(III) on it. In embodiments, collecting and purifying the precipitated Ra salt may comprise filtrating the Ra salt. In embodiments, if the Ra salt is $Ra(NO_3)_2$, collecting and purifying the precipitated Ra salt may comprise transforming the $Ra(NO_3)_2$ into $RaCl_2$. In some embodiments, transforming the $Ra(NO_3)_2$ into $RaCl_2$ may comprise (re)precipitating $Ra(NO_3)_2$ as $RaCO_3$, dissolving the $RaCO_3$ in HCl (e.g. 0.1-1 M HCl) and evaporating the obtained solution to dryness to produce a $RaCl_2$ solid. In other embodiments, transforming the $Ra(NO_3)_2$ into $RaCl_2$ may comprise loading the $Ra(NO_3)_2$ onto a cation-exchanger, rinsing the cation-exchanger with a 0.001-0.1 M HCl solution (to remove residual nitrates) and eluting a $RaCl_2$ solution from the cation-exchanger using a 1-10 M HCl solution.

In embodiments, the method may comprise a further separation step using an extraction chromatographic column based on a crown ether resin. In embodiments wherein the first resin is the DGA resin, the further separation step based on the crown ether resin may be performed before step a, or after step b and before step c (if present). In embodiments wherein the first resin is the HDAP resin, the further separation step based on the crown ether resin may be performed after step a and before step b, or after step c (if present). In embodiments, the crown ether resin may be based on an 18-crown-6. In embodiments, the 18-crown-6 may be dicyclohexano-18-crown-6, preferably a di(alkylcyclohexano)-18-crown-6. In embodiments, the di(alkylcyclohexano)-18-crown-6 may have a general chemical formula of:

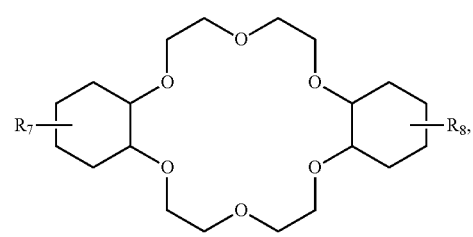

wherein $R_7$ and $R_8$ are independently selected alkyl substituents. In preferred embodiments, the di(alkylcyclohexano)-18-crown-6 may be a di(t-butylcyclohexano)-18-crown-6 with general chemical formula:

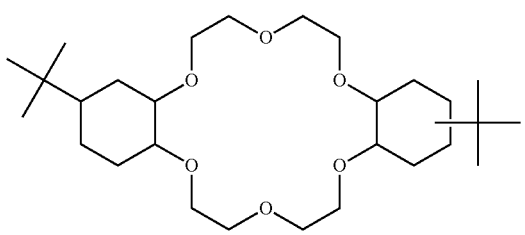

In embodiments, the di(t-butylcyclohexano)-18-crown-6 may be a 4-4'-di(t-butylcyclohexano)-18-crown-6 or a 4-4'-di(t-butylcyclohexano)-18-crown-6 or a mixture thereof.

In embodiments, the method may comprise a further separation step based on a dialkyl alkylphosphonate resin. In embodiments, the further separation step based on the dialkyl alkylphosphonate resin may be performed after step a and before step b, or after step b and before step c (if present). In embodiments wherein the first resin is the HDAP resin, the further separation step based on the dialkyl alkylphosphonate resin may be performed after step c (if present). In embodiments, the dialkyl alkylphosphonate resin may be a resin based on a dialkyl alkylphosphonate. In embodiments, the dialkyl alkylphosphonate may have a general chemical formula of:

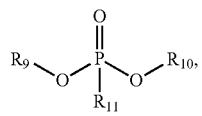

wherein $R_9$, $R_{10}$ and $R_{11}$ are independently selected alkyl substituents. In preferred embodiments, the dialkyl alkylphosphonate may be dipentyl pentylphosphonate.

In embodiments, the extraction chromatographic column based on the crown ether resin and/or the extraction chromatographic column based on the dialkyl alkylphosphonate resin may be coupled in tandem with the extraction chromatographic column therebefore and/or thereafter. In embodiments, if the further separation steps based on the crown ether resin and the dialkyl alkylphosphonate resin are both performed after step b and before step c (if present), or both after step c (if present), the separation step based on the crown ether resin may be performed before the separation step based on the dialkyl alkylphosphonate resin.

In embodiments, any feature of any embodiment of the first aspect may independently be as correspondingly described for any embodiment of any other aspect.

In a second aspect, the present invention relates to a device comprising means for carrying out the steps of the method according to any embodiment of the first aspect.

In embodiments, the device may comprise (i) an input for the mixture, (ii) an output for the purified Ac, and (iii) means for automating steps a, b and, if present, c.

In embodiments, the means for automating steps a, b and, if present, c may comprise pumps, valves and controllers for selecting and using suitable matrix solutions, washing solutions and eluents.

In embodiments, the means for automating steps a, b and, if present, c may comprise valves and controllers for coupling and de-coupling the first, second and, if present, third extraction chromatographic columns.

In embodiments, the means for automating steps a, b and, if present, c may comprise instruments for analysing (e.g. spectroscopically) the composition of an eluted fraction.

In embodiments, any feature of any embodiment of the second aspect may independently be as correspondingly described for any embodiment of any other aspect. In a third aspect, the present invention may relate to a computer program product comprising instructions which, when the program is executed by a computer, cause the computer to carry out the steps of the method according to any embodiment of the first aspect.

In embodiments, the computer program product may be for controlling a device according to an embodiment of the second aspect.

In embodiments, any feature of any embodiment of the third aspect may independently be as correspondingly described for any embodiment of any other aspect.

In a fourth aspect, the present invention relates to a computer-readable medium comprising instructions which, when executed by a computer, cause the computer to carry out the steps of the method according to any embodiment of the first aspect.

In embodiments, any feature of any embodiment of the fourth aspect may independently be as correspondingly described for any embodiment of any other aspect.

The invention will now be described by a detailed description of several embodiments of the invention. It is clear that other embodiments of the invention can be configured according to the knowledge of the person skilled in the art without departing from the true technical teaching of the invention, the invention being limited only by the terms of the appended claims.

Example 1: Purifying Ac Using a DGA/HDEHP(/DGA) Route

Example 1a

Figure 3:
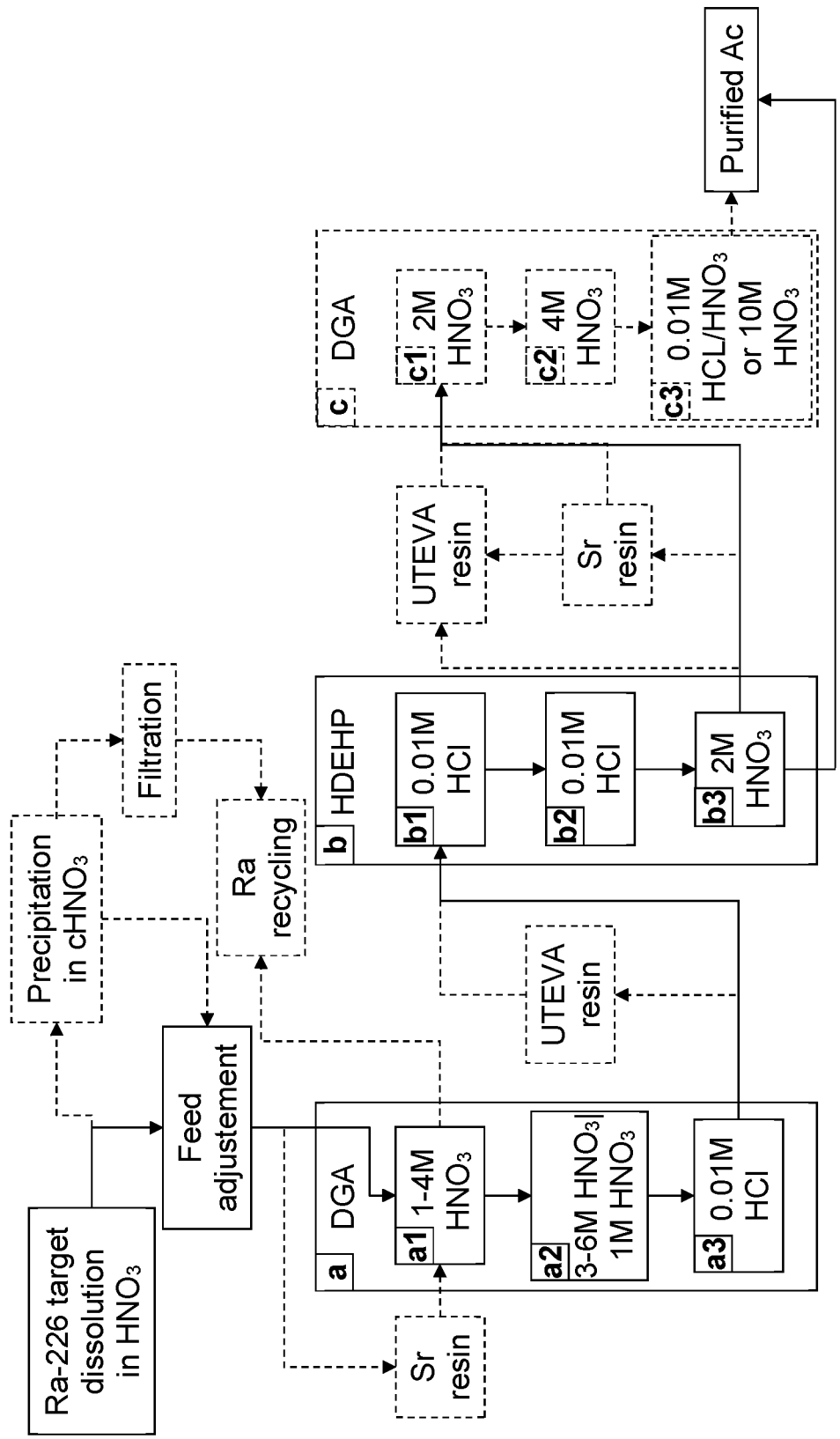
FIGS. 3 to 5 are flow-charts in accordance with exemplary embodiments of the present invention.

We now refer to FIG. 3, showing a flow-chart of this example.

A proton irradiated Ra-226 target was first dissolved in a 1-6 M $HNO_3$ solution.

Optionally, Ra could be separated out of this solution by precipitation of $Ra(NO_3)_2$ in a concentrated $HNO_3$ solution (e.g. ≥6 M $HNO_3$). After filtration, this Ra could be recycled, for example to make a new Ra target for proton irradiation.

Either directly after dissolution or after the optional precipitation step, the Ac sample was loaded (step a1), through a feed adjustment system, onto a first extraction chromatographic column based on a diglycolamide (DGA) first resin and a 1-4 M $HNO_3$ first matrix solution. This loading optionally occurred by first passing through an optional crown ether extraction chromatographic column (e.g. based on an Sr resin, as is commercially available from Eichrom); this optional column was preferably coupled in tandem to the first extraction chromatographic column. The optional crown ether extraction chromatographic column can advantageously aid in stopping a majority of Po and Pb that may be present in the sample, while passing through Ra, Ac and Bi.

The DGA first extraction chromatographic column with the Ac sample loaded thereon was then washed (step a2) using as first washing solution initially a 3-6 M $HNO_3$ solution and subsequently a 1 M $HNO_3$ solution. In this way, mainly residual Ra and Pb could be washed off and this fraction could be optionally collected for Ra recycling (cf. supra).

The DGA first extraction chromatographic column was then eluted (step a3) with a 0.01 M HCl solution as a first eluent; this allowed to strip Ac selectively with respect to any residual Po and Bi, which remained on the DGA first extraction chromatographic column. The Ac-containing first eluate so obtained was then loaded (step b1) onto a second extraction chromatographic column based on a di-(2-ethylhexyl)phosphoric acid (HDEHP) second resin and a 0.01 M HCl second matrix solution. Preferably, the DGA first extraction chromatographic column and HDEHP second extraction chromatographic column were coupled in tandem, so that the elution in step a3 and loading in step b1 occurred concurrently, without intermediately collecting the first eluate. Optionally, the loading in step b1 occurred by passing through an optional dialkyl alkylphosphonate extraction chromatographic column (e.g. based on a UTEVA resin, as is commercially available from Eichrom); this optional column was preferably coupled in tandem to the first extraction chromatographic column and/or to the second extraction chromatographic column, so that the intermediate fractions needn't be collected.

The HDEHP second extraction chromatographic column with the first eluate loaded thereon was then washed (step b2) using a 0.01 M HCl second washing solution. In this way, any residual Ra and Pb could be further washed off.

The HDEHP second extraction chromatographic column was then eluted (step b3) with a 2 M $HNO_3$ solution as a second eluent. The so obtained second eluate already corresponded to a well-purified Ac; as such, it was possible to collect the second elate and stop the purification at this point.

Nevertheless, for even further purification, the second eluate could optionally be loaded (step c1) onto a third extraction chromatographic column based on a DGA third resin and a 2 M $HNO_3$ first matrix solution. Preferably, the HDEHP second extraction chromatographic column and DGA third extraction chromatographic column were coupled in tandem, so that the elution in step b3 and loading in step c1 occurred concurrently, without intermediately collecting the second eluate. Optionally, the loading in step c1 occurred by passing through an optional crown ether extraction chromatographic column (e.g. based on the Sr resin) and/or an optional dialkyl alkylphosphonate extraction chromatographic column (e.g. based on the UTEVA resin). These optional columns were preferably coupled in tandem to the second extraction chromatographic column and/or to each other (if both were used) and/or to the third extraction chromatographic column, so that the intermediate fractions needn't be collected. If both the crown ether and dialkyl alkylphosphonate columns were used, the second eluate was typically first passed through the former and then through the latter.

The DGA third extraction chromatographic column with the second eluate loaded thereon was then washed (step c2) using a 4 M $HNO_3$ third washing solution.

The DGA third extraction chromatographic column was then eluted (step c3) with as a third eluent either a 0.01 M HCl/$HNO_3$ solution or a 10 M $HNO_3$ solution, selectively with respect to any residual Pb, Po, Bi or La. The so obtained third eluate corresponded to a (further) well-purified Ac solution.

Example 1b

Figure 4:
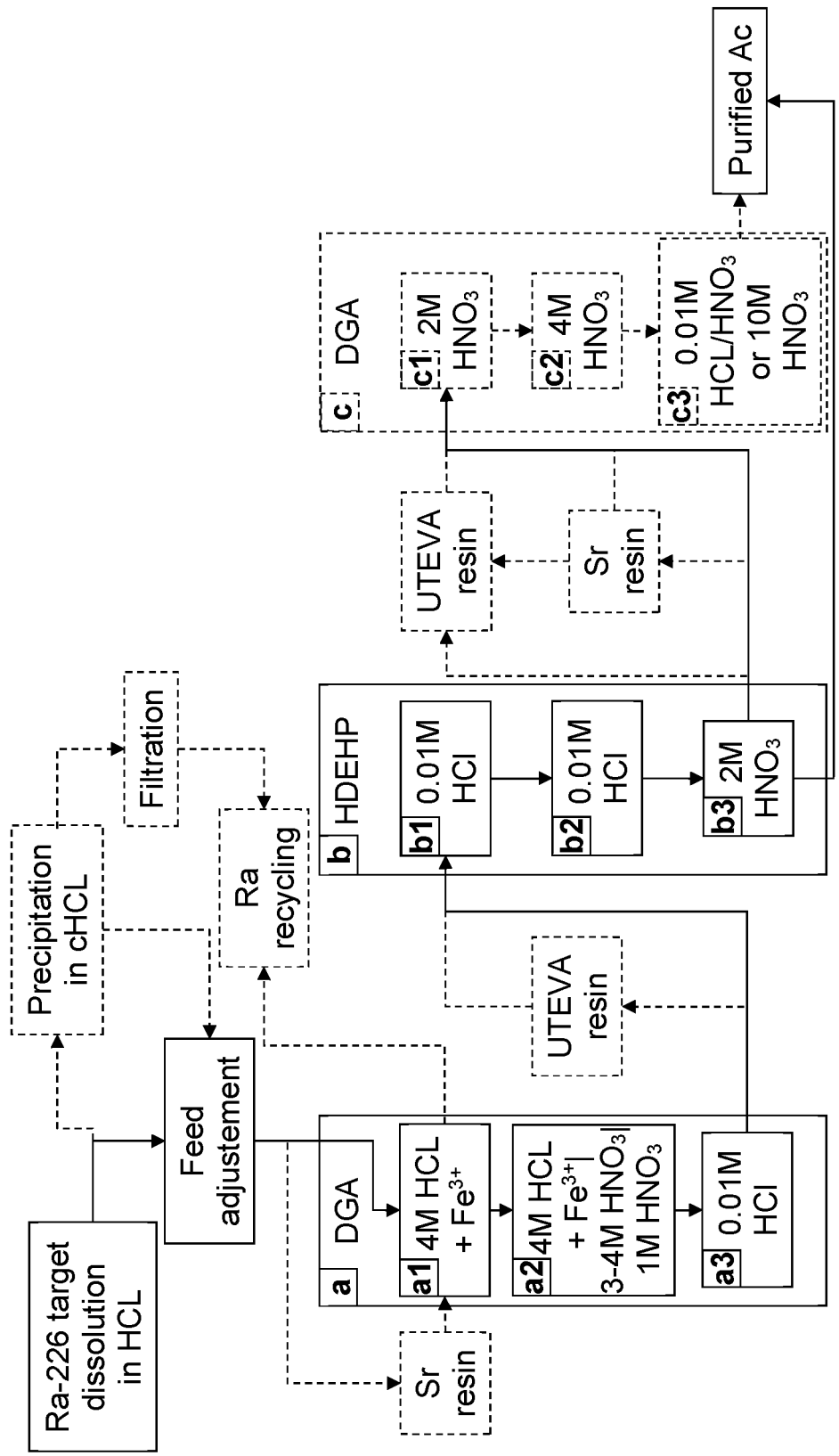

We now refer to FIG. 4, showing a flow-chart of this example.

A proton irradiated Ra-226 target was first dissolved in a 1-3 M HCl solution.

Optionally, Ra could be separated out of this solution by precipitation of $RaCl_2$ in a concentrated HCl solution (e.g. ≥6 M HCl). After filtration, this Ra could be recycled, for example to make a new Ra target for proton irradiation.

Either directly after dissolution or after the optional precipitation step, the Ac sample was loaded (step a1), through a feed adjustment system, onto a first extraction chromatographic column based on a DGA first resin and a first matrix solution consisting of a 4 M HCl solution with 50-2000 mg/L Fe(III). This loading optionally occurred by first passing through an optional crown ether extraction chromatographic column (e.g. based on an Sr resin, as is commercially available from Eichrom); this optional column was preferably coupled in tandem to the first extraction chromatographic column. The optional crown ether extraction chromatographic column can advantageously aid in stopping a majority of Po and Pb that may be present in the sample, while passing through Ra, Ac and Bi.

The DGA first extraction chromatographic column with the Ac sample loaded thereon was then washed (step a2) using as first washing solution initially a 4 M HCl solution with 50-2000 mg/L Fe(III), followed by a 3-4 M $HNO_3$ solution and finally a 1 M $HNO_3$ solution. In this way, mainly residual Ra and Pb could be washed off and this fraction could be optionally collected for Ra recycling (cf. supra).

The DGA first extraction chromatographic column was then eluted (step a3) with a 0.01 M HCl solution as a first eluent; this allowed to strip Ac selectively with respect to any residual Po and Bi, which remained on the DGA first extraction chromatographic column. The Ac-containing first eluate so obtained was then loaded (step b1) onto a second extraction chromatographic column based on an HDEHP second resin and a 0.01 M HCl second matrix solution. Preferably, the DGA first extraction chromatographic column and HDEHP second extraction chromatographic column were coupled in tandem, so that the elution in step a3 and loading in step b1 occurred concurrently, without intermediately collecting the first eluate. Optionally, the loading in step b1 occurred by passing through an optional dialkyl alkylphosphonate extraction chromatographic column (e.g. based on a UTEVA resin, as is commercially available from Eichrom); this optional column was preferably coupled in tandem to the first extraction chromatographic column and/or to the second extraction chromatographic column, so that the intermediate fractions needn't be collected.

The HDEHP second extraction chromatographic column with the first eluate loaded thereon was then washed (step b2) using a 0.01 M HCl second washing solution. In this way, any residual Ra, Pb and Fe could be further washed off. Optionally, ascorbic acid or another reducing agent could be added to the second washing solution, so to convert residual Fe(III) to Fe(II). Fe(II) has no affinity for the extractant.

The HDEHP second extraction chromatographic column was then eluted (step b3) with a 2 M $HNO_3$ solution as a second eluent. The so obtained second eluate already corresponded to a well-purified Ac; as such, it was possible to collect the second elate and stop the purification at this point.

Nevertheless, for even further purification, the second eluate could optionally be loaded (step c1) onto a third extraction chromatographic column based on a DGA third resin and a 2 M $HNO_3$ first matrix solution. Preferably, the HDEHP second extraction chromatographic column and DGA third extraction chromatographic column were coupled in tandem, so that the elution in step b3 and loading in step c1 occurred concurrently, without intermediately collecting the second eluate. Optionally, the loading in step c1 occurred by passing through an optional crown ether extraction chromatographic column (e.g. based on the Sr resin) and/or an optional dialkyl alkylphosphonate extraction chromatographic column (e.g. based on the UTEVA resin). These optional columns were preferably coupled in tandem to the second extraction chromatographic column and/or to each other (if both were used) and/or to the third extraction chromatographic column, so that the intermediate fractions needn't be collected. If both the crown ether and dialkyl alkylphosphonate columns were used, the second eluate was typically first passed through the former and then through the latter.

The DGA third extraction chromatographic column with the second eluate loaded thereon was then washed (step c2) using a 4 M $HNO_3$ third washing solution.

The DGA third extraction chromatographic column was then eluted (step c3) with as a third eluent either a 0.01 M HCl/$HNO_3$ solution or a 10 M $HNO_3$ solution, selectively with respect to any residual Pb, Po, Bi or La. The so obtained third eluate corresponded to a (further) well-purified Ac solution.

This loading optionally occurred by first passing through an optional crown ether extraction chromatographic column (e.g. based on an Sr resin, as is commercially available from Eichrom); this optional column was preferably coupled in tandem to the first extraction chromatographic column. The optional crown ether extraction chromatographic column can advantageously aid in stopping a majority of Po and Pb that may be present in the sample, while passing through Ra, Ac and Bi.

Example 2: Purifying Ac Using an HDEHP/DGA(/HDEHP) Route

Figure 5:
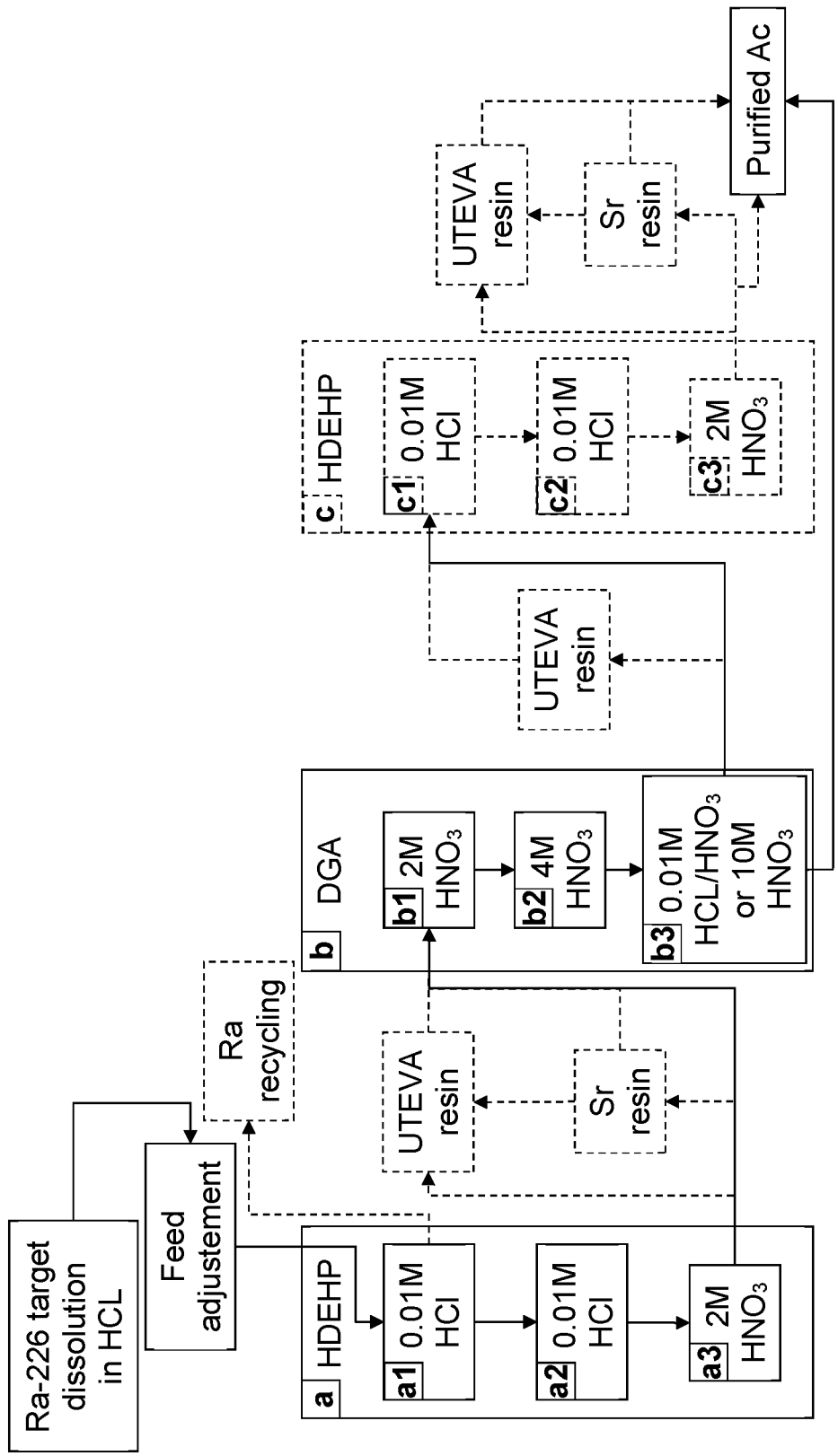

We now refer to FIG. 5, showing a flow-chart of this example.

A proton irradiated Ra-226 target was first dissolved in a 0.001-0.1 M HCl solution.

The Ac sample was then loaded (step a1), through a feed adjustment system, onto a first extraction chromatographic column based on an HDEHP first resin and a 0.01 M HCl first matrix solution.

The HDEHP first extraction chromatographic column with the Ac sample loaded thereon was then washed (step a2) using as first washing solution a 0.01 M HCl solution. In this way, any residual Ra and Pb could be further washed off and this fraction could be optionally collected for Ra recycling (cf. supra).

The HDEHP first extraction chromatographic column was then eluted (step a3) with a 2 M $HNO_3$ solution as a second eluent. The Ac-containing first eluate so obtained was then loaded (step b1) onto a second extraction chromatographic column based on a DGA second resin and a 0.01 M HCl second matrix solution. Preferably, the HDEHP first extraction chromatographic column and DGA second extraction chromatographic column were coupled in tandem, so that the elution in step a3 and loading in step b1 occurred concurrently, without intermediately collecting the first eluate. Optionally, the loading in step b1 occurred by passing through an optional crown ether extraction chromatographic column (e.g. based on an Sr resin, as is commercially available from Eichrom) and/or an optional dialkyl alkylphosphonate extraction chromatographic column (e.g. based on a UTEVA resin, as is commercially available from Eichrom). These optional columns were preferably coupled in tandem to the first extraction chromatographic column and/or to each other (if both were used) and/or to the second extraction chromatographic column, so that the intermediate fractions needn't be collected. If both the crown ether and dialkyl alkylphosphonate columns were used, the first eluate was typically first passed through the former and then through the latter.

The DGA second extraction chromatographic column with the first eluate loaded thereon was then washed (step b2) using a 4 M $HNO_3$ second washing solution.

The DGA second extraction chromatographic column was then eluted (step b3) with as a third eluent either a 0.01 M HCl/$HNO_3$ solution or a 10 M $HNO_3$ solution, selectively with respect to any residual Pb, Po, Bi or La. The so obtained second eluate already corresponded to a well-purified Ac; as such, it was possible to collect the second elate and stop the purification at this point.

Nevertheless, for even further purification, the second eluate could optionally be loaded (step c1) onto a third extraction chromatographic on an HDEHP first resin and a 0.01 M HCl first matrix solution. Preferably, the DGA second extraction chromatographic column and HDEHP third extraction chromatographic column were coupled in tandem, so that the elution in step b3 and loading in step c1 occurred concurrently, without intermediately collecting the second eluate.

Optionally, the loading in step c1 occurred by passing through an optional dialkyl alkylphosphonate extraction chromatographic column (e.g. based on a UTEVA resin); this optional column was preferably coupled in tandem to the first extraction chromatographic column and/or to the second extraction chromatographic column, so that the intermediate fractions needn't be collected.

The HDEHP third extraction chromatographic column with the second eluate loaded thereon was then washed (step c2) using a 0.01 M HCl third washing solution. In this way, any residual Ra and Pb could be further washed off.

The DGA third extraction chromatographic column was then eluted (step c3) with as a third eluent either a 2 M $HNO_3$ solution. The so obtained third eluate corresponded to a (further) well-purified Ac solution. Optionally, the elution in step c3 occurred by passing, prior to collecting the final purified Ac, through an optional crown ether extraction chromatographic column (e.g. based on an Sr resin, as is commercially available from Eichrom) and/or an optional dialkyl alkylphosphonate extraction chromatographic column (e.g. based on a UTEVA resin, as is commercially available from Eichrom). These optional columns were preferably coupled in tandem to the third extraction chromatographic column and/or to each other (if both were used), so that the intermediate fractions needn't be collected. If both the crown ether and dialkyl alkylphosphonate columns were used, the third eluate was typically first passed through the former and then through the latter.

Example 3: Ac-Purification Device

Optionally, any of example 1a, 1b or 2 can advantageously be performed using a therefore adapted device. Such a device can accept an Ac-containing mixture as an input and can output a purified Ac mixture, while automating many or all of the steps therebetween.

For example, using suitable pumps, valves and controllers (which may e.g. be computer-controlled by an appropriate computer-program product), the device can be adapted to automatically select (e.g. from stock solutions which are either pre-prepared to have the desired composition and concentration, or which are mixed and/or diluted in situ) and introduce the appropriate matrix solutions, washing solutions and eluents. Likewise, the device can for example be adapted to automatically switch the connections between adjacent extraction chromatographic columns; thereby switching between either separating out eluted fractions (e.g. during the loading and washing steps) and otherwise leading eluded fractions to the next step (e.g. leading the eluates to be loaded onto a further column in a next loading step).

The device can further comprise tools (e.g. a spectrophotometer) for analysing the eluted fractions and can use this information to decide when to switch from one step to the next. For example, the device can monitor a particular chemical species in the currently eluting fraction and switch, e.g. from a washing step to an eluting step, once the concentration of said species drops below a threshold value. Alternatively, suitable switching times could be pre-programmed into the device.

It is to be understood that although preferred embodiments, specific constructions and configurations, as well as materials, have been discussed herein for devices according to the present invention, various changes or modifications in form and detail may be made without departing from the scope and technical teachings of this invention. For example, any formulas given above are merely representative of procedures that may be used. Functionality may be added or deleted from the block diagrams and operations may be interchanged among functional blocks. Steps may be added or deleted to methods described within the scope of the present invention. It further is to be noticed that the examples are not limiting and that the method is applicable to all kinds of AC-225 production starting from Ra-226, e.g. also from Ra-226 (gamma n) Ra-225 to AC-225, e.g. from Ra-226(n,2n)Ra-225 to Ac-225, e.g. from Ra-226(d,3n) to Ac-225, etc.

The invention claimed is:

1. A method for purifying Ac from a mixture comprising Ac and at least one element selected from Ra, Pb, Po, Bi and La, the method comprising:
   a. performing a first separation, comprising
      a1. loading the mixture on a first extraction chromatographic column based on a first resin and a first matrix solution,
      a2. washing the mixture loaded on the first extraction chromatographic column with a first washing solution, and
      a3. eluting the mixture loaded on the first extraction chromatographic column with a first eluent to obtain a first eluate; and
   b. performing a second separation, comprising
      b1. loading the first eluate on a second extraction chromatographic column based on a second resin and a second matrix solution,
      b2. washing the first eluate loaded on the second extraction chromatographic column with a second washing solution, and
      b3. eluting the first eluate loaded on the second extraction chromatographic column with a second eluent to obtain a second eluate containing the purified Ac;
   wherein either
      the first resin is a diglycolamide resin, the first matrix solution has a pH between −0.8 and 0, the first washing solution has a pH between −0.8 and 0 and the first eluent has a pH between 1 and 4, and
      the second resin is a dialkyl phosphoric acid resin, the second matrix solution has a pH between 1 and 4, the second washing solution has a pH between 1 and 4 and the second eluent has a pH between −0.8 and 0; or
      the first resin is a dialkyl phosphoric acid resin, the first matrix solution has a pH between 1 and 4, the first washing solution has a pH between 1 and 4 and the first eluent has a pH between −0.8 and 0, and
      the second resin is a diglycolamide resin, the second matrix solution has a pH between −0.8 and 0, the second washing solution has a pH between −0.8 and 0 and the second eluent has a pH between 1 and 4,
   wherein the first eluate obtained in step a3 is loaded immediately onto the second extraction chromatographic column in step b1, by forming a tandem between the first and the second extraction chromatographic column.

2. The method according to claim 1, comprising a step c for further purifying Ac, after step b, of:
   c. performing a third separation, comprising
      c1. loading the second eluate on a third extraction chromatographic column based on a third resin and a third matrix solution,
      c2. washing the second eluate loaded on the third extraction chromatographic column with a third washing solution, and
      c3. eluting the second eluate loaded on the third extraction chromatographic column with a third eluent to obtain a third eluate containing the further purified Ac;
   wherein
      if the first resin is a diglycolamide resin, then the third resin is a diglycolamide resin, the third matrix solution has a pH between −0.8 and 0, the third washing solution has a pH between −0.8 and 0 and the third eluent has a pH between 1 and 2 or between −0.9 and −1.1; and
      if the first resin is a dialkylphosphoric acid resin, then the third resin is a dialkyl phosphoric acid resin, the third matrix solution has a pH between 1 and 4, the third washing solution has a pH between 1 and 4 and the third eluent has a pH between −0.3 and 1.

3. The method according to claim 1, wherein the mixture comprises:
   i. at least one element selected from Ra and Pb, and
   ii. at least one element selected from Po and Bi.

4. The method according to claim 1, wherein the mixture is a mixture derived from an irradiated target.

5. The method according to claim 4, wherein the mixture is a solution obtained by dissolving the irradiated target.

6. The method according to claim 4, wherein the irradiated target is an irradiated Ra target.

7. The method according to claim 1, wherein the Ac is Ac-225.

8. The method according to claim 1, wherein the first and/or second matrix solution, and/or the first and/or second washing solution, and/or the first and/or second eluent comprises $HNO_3$ and/or HCl.

9. The method according to claim 1, comprising a further step, before step a, of precipitating a Ra salt from the mixture.

10. The method according to claim 1, further comprising collecting and purifying Ra from the mixture.

11. The method according to claim 1, comprising a further separation step using an extraction chromatographic column based on a crown ether resin and/or an extraction chromatographic column based on a dialkyl alkylphosphonate resin.

12. The method according to claim 11, wherein the extraction chromatographic column based on the crown ether resin and/or the extraction chromatographic column based on the dialkyl alkylphosphonate resin is coupled in tandem with the extraction chromatographic column therebefore and/or thereafter.

* * * * *